Oct. 9, 1923.

J. H. GRAVELL

CHAIN LINK WELDING

Filed June 3, 1921

1,470,160

Inventor
JAMES H. GRAVELL
By his Attorneys
Townsend & Decker

Patented Oct. 9, 1923.

1,470,160

UNITED STATES PATENT OFFICE.

JAMES H. GRAVELL, OF ELKINS PARK, PENNSYLVANIA, ASSIGNOR TO THOMSON ELECTRIC WELDING COMPANY, OF BOSTON, MASSACHUSETTS, A CORPORATION OF MASSACHUSETTS.

CHAIN-LINK WELDING.

Application filed June 3, 1921. Serial No. 474,737.

*To all whom it may concern:*

Be it known that I, JAMES H. GRAVELL, a citizen of the United States, and a resident of Elkins Park, in the county of Montgomery and State of Pennsylvania, have invented certain new and useful Improvements in Chain-Link Welding, of which the following is a specification.

My invention relates to a process of manufacturing the links or eyes of a chain or eye-bar and more particularly relates to a process wherein two links or two eyes are made simultaneously from one heat.

The invention is particularly designed to make use of the heating effects of an electric current as a means for bringing the parts to a welding and forming temperature but may be practiced by using other means for heating.

As carried out by the use of electricity the invention consists in bringing the free ends of two similar metal blanks which ordinarily would be of U form into contact with one another, passing a heating electric current from one blank to the other across the two places of contact to bring them to welding and forming temperature and then applying suitable forming or pressure dies transversely to the two blanks at the place of heating and thereby forming each blank into a link which is connected to the other link by metal consolidated from the heated parts by applied pressure.

1, 1' indcates the two metal blanks which, as shown, are of general U form although, as will be understood, this form may be varied without departing from the invention. 2 indicates suitable metal heating clamps for holding the said blanks and for passing heating electric current through them while they are in contact with one another at the points 3. The clamps 2 may be like those of an electric welder in that they are suitably formed to allow insertion and withdrawal of the work or pieces of work employed in the operation and one or both of them may be movable to and from the other to permit the blanks 1 to be brought into engagement and to also allow them to move under any influence of the transversely applied pressure dies when the latter are brought together to squeeze the work and form and weld the heated parts.

4 indicates upper and lower pressure or forging dies having their work engaging surfaces suitably shaped to the desired form of the completed work. Preferably one or both of them is made in two parts capable of movement independently of one another to enable the work to be formed and welded in two stages. In this case each may be provided with a central independently movable part 4'. 5 indicates mandrels of a form dependent upon the form of the blank and upon the finished eye-bar, said mandrels being insertable and removable at will after the usual practice in forging operations. For this purpose the clamps and their jaws are provided with suitable spaces at the part occupied by said mandrels.

Figure 1:
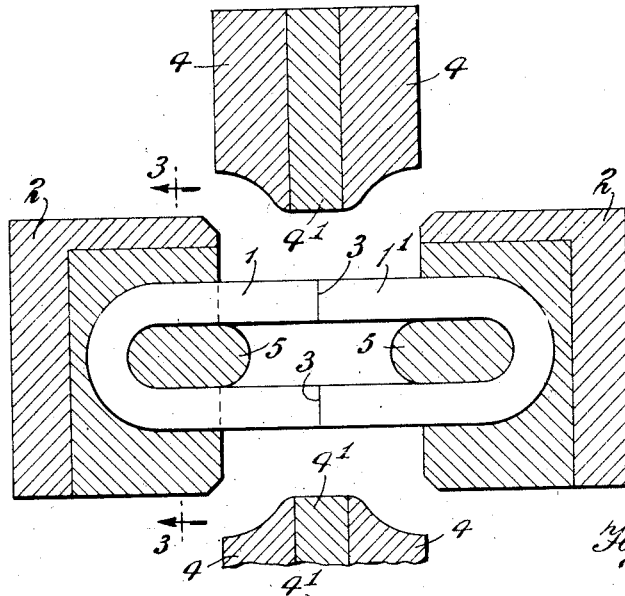
Fig. 1 is a vertical section through a form of apparatus which may be employed in practicing the invention and shows two blanks in place therein and arranged for heating.
Figure 2:
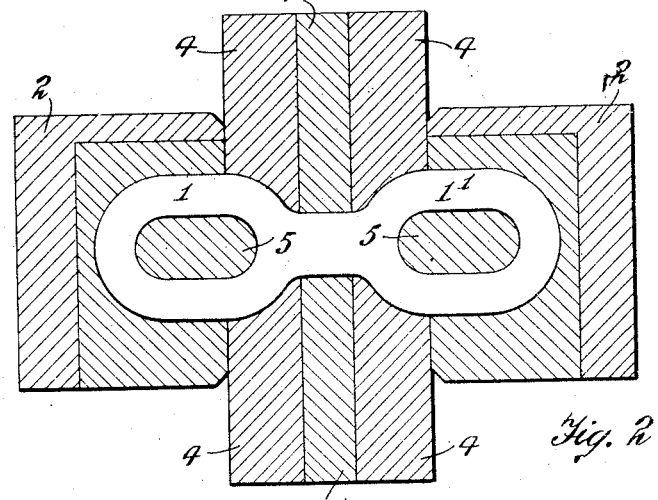
Fig. 2 is a similar view of the apparatus after the application of the forming and welding pressure to the heated section of work and shows the links formed and the metal connecting them consolidated from the heated metal blanks.
Figure 3:
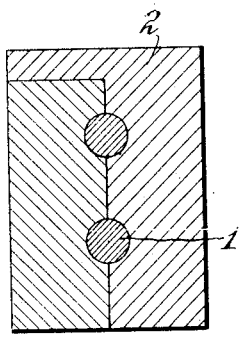
Fig. 3 is a vertical section on the line 3—3 Fig. 1.
Figure 4:
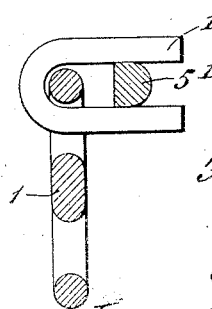
Fig. 4 illustrates in section a modification in the form of the mandrel that may be used in practicing the invention.

In the operation the two blanks 1, 1', previously shaped, are inserted in the clamps 2 and their free ends are brought into light contact with one another by moving up one or both clamps and they are then heated at the point of contact 3 and parts contiguous thereto by the passage of a heavy heating current from one to the other of the clamps 2, or heated in any other suitable way. When they have reached the proper forming and welding temperature which will be apparent to the eye of one skilled in the art of metal working operations, the die 4 is applied to exert transverse welding and forming pressure upon the heated parts, the two sections of said die being employed either together or one after the other as may be desired and as will best facilitate the shaping, consolidating and welding together of the work to produce the finished result shown in Fig. 2 wherein, as will be seen, the open ends of each U blank will be brought into shape around the mandrel and are welded or consolidated, thereby producing in effect two links or eyes and a consolidated mass of metal connecting them. The connected links or eye-bar thus made may be employed for any desired purpose as for instance in the making up of a chain in which each eye or link is threaded through a contiguous link or eye of an eye-bar. When employed in this manner in a chain it is desirable to use a mandrel such as indicated at 5', Fig. 4, so that a space may be left for the eye of a previously formed link through which one of the blanks of the eye-bar next to be made is threaded previously to the welding and forming operation.

What I claim as my invention is:—

1. The herein described method of forming simultaneously two links or eyes of a chain or eye-bar, consisting in bringing the free ends of two similar metal blanks into contact with one another, heating the contacting ends and parts contiguous thereto to welding and forming temperature and then applying transverse pressure to weld the contacting free ends together and simultaneously produce by one and the same operation two eyes or links while the blanks are retained in their heating clamps.

2. The herein described method of forming simultaneously two links or eyes of a chain or eye-bar, consisting in bringing the free ends of two similar blanks into contact with one another, passing a heating current from one blank to the other across the two places of contact to bring them to welding and forming temperature and then simultaneously welding all the free ends of the two links together by the transversely applied pressure of suitable forming dies.

3. The herein described method of forming simultaneously two links or eyes of a chain or eye-bar, consisting in bringing the free ends of two similar blanks into contact with one another, passing a heating current from one blank to the other across the two places of contact to bring them to welding and forming temperature and then applying transverse pressure of suitable forming dies while said blanks are retained in the current supplying clamps to simultaneously weld the free ends of each blank to one another and to the free ends of the other blank, thus producing two links.

4. The herein described process of making two links or eyes of a chain or eye-bar by passing an electric current from one to the other of two similar blanks the ends of which are in contact with one another to bring the contacting ends and parts contiguous thereto to welding and forming temperature and then forming each blank into a welded eye or link united with the eye formed from the other by the transversely applied pressure of suitable forming and welding dies.

5. The herein described process of forming an eye-bar having eyes at opposite ends, consisting in heating two similar blanks at their contacting free ends to bring them to welding and forming temperature at and near the places of contact and then applying pressure transversely to form two eyes and consolidate the heated parts into a bar connecting said eyes by one and the same operation.

6. The herein described process of forming an eye-bar having eyes at opposite ends, consisting in heating two similar blanks at their contacting free ends to bring them to welding and forming temperature at and near the places of contact and then applying pressure transversely to weld the blanks into two eyes and at the same time consolidate the heated parts into a bar connecting said eyes while the blanks are retained in the heating clamps.

7. The herein described process of forming an eye-bar consisting in assembling two similar blanks in suitable current supplying clamps with the free ends of said blanks in contact, passing heating electric current from one blank to the other and applying pressure transversely to form each blank into an eye and by the same pressure consolidate the heated parts into a bar connecting said eyes.

8. The herein described process of forming an eye-bar consisting in assembling two similar blanks in suitable current supplying clamps with the free ends of said blanks in contact, passing heating electric current from one blank to the other and applying pressure transversely to form each blank into an eye and at the same time consolidate the heated parts into a bar connecting said eyes all while the blanks are retained in said heating clamps.

Signed at New York, in the county of New York and State of New York, this 2d day of June A. D., 1921.

JAMES H. GRAVELL.